Figure 1:
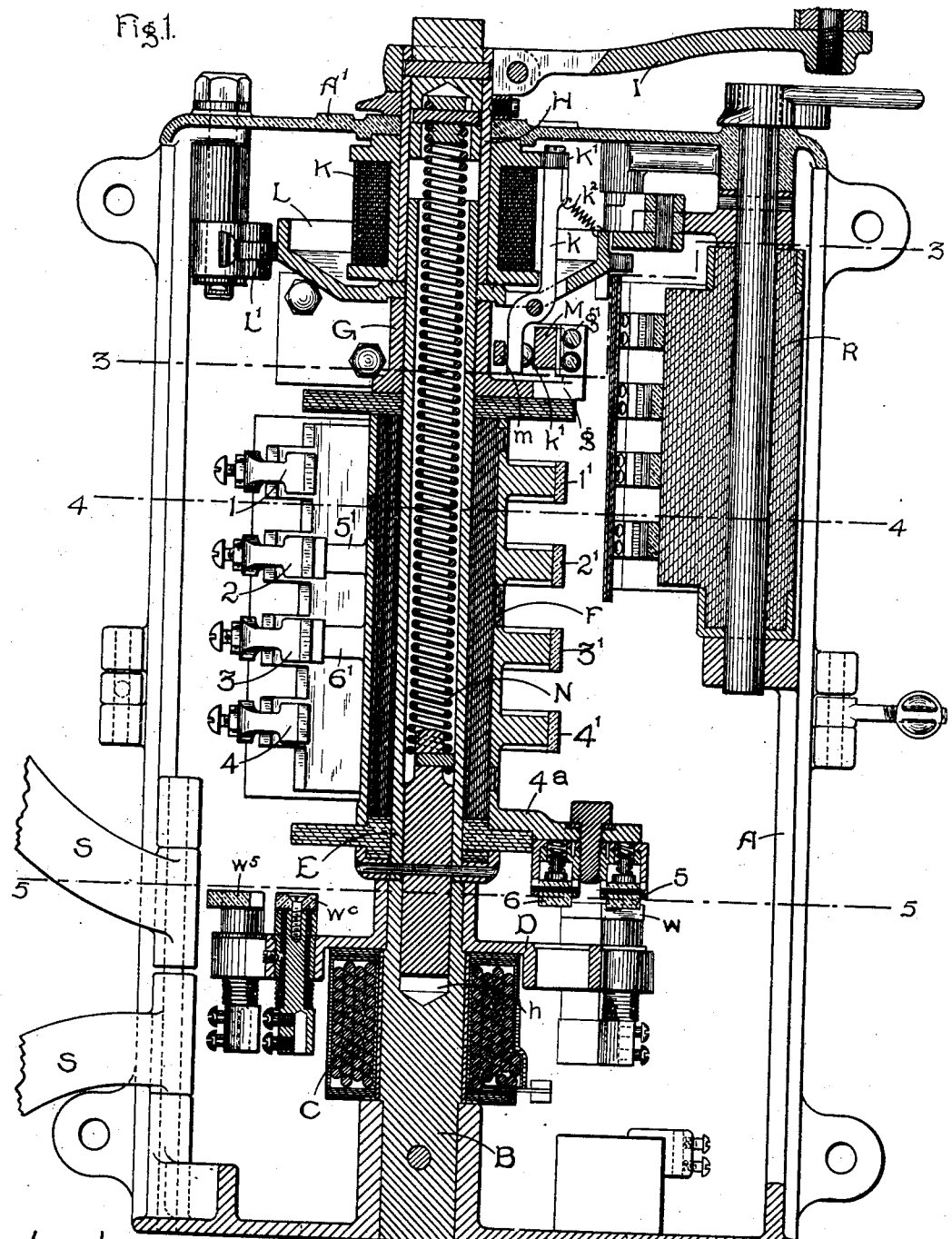

No. 708,096. Patented Sept. 2, 1902.
L. A. TIRRILL.
CONTROLLER FOR ELECTRIC MOTORS.
(Application filed Feb. 14, 1901.)
(No Model.) 5 Sheets—Sheet 1.

WITNESSES.
Henry Westendarp.
Alex T. Macdonald

INVENTOR
Leonard A Tirrill
by Albert G. Davis
ATTY.

No. 708,096. Patented Sept. 2, 1902.
L. A. TIRRILL.
CONTROLLER FOR ELECTRIC MOTORS.
(Application filed Feb. 14, 1901.)
(No Model.) 5 Sheets—Sheet 2.

WITNESSES.
Benjamin B. Hull
Alex F. Macdonald

INVENTOR
Leonard A Tirrill
by Albert G. Davis
ATTY.

No. 708,096. Patented Sept. 2, 1902.
L. A. TIRRILL.
CONTROLLER FOR ELECTRIC MOTORS.
(Application filed Feb. 14, 1901.)
(No Model.) 5 Sheets—Sheet 5.

WITNESSES_
Benjamin B. Hull,
Alex F. Macdonald.

INVENTOR_
Leonard A Tirrill
by Albert G. Davis
ATTY-

UNITED STATES PATENT OFFICE.

LEONARD A. TIRRILL, OF LYNN, MASSACHUSETTS, ASSIGNOR TO GENERAL ELECTRIC COMPANY, A CORPORATION OF NEW YORK.

CONTROLLER FOR ELECTRIC MOTORS.

SPECIFICATION forming part of Letters Patent No. 708,096, dated September 2, 1902.

Application filed February 14, 1901. Serial No. 47,196. (No model.)

*To all whom it may concern:*

Be it known that I, LEONARD A. TIRRILL, a citizen of the United States, residing at Lynn, county of Essex, State of Massachusetts, have invented certain new and useful Improvements in Controllers for Electric Motors, (Case No. 1,700,) of which the following is a specification.

This invention relates to controllers for electric motors; and its object is to provide a controller of compact form for governing motors used in running printing-presses or other machinery. It is desirable that a printing-press motor shall have considerable torque at starting and run at an even speed irrespective of the constantly-varying load and that means shall be provided for stopping it instantly in case of necessity, such as an overload or an accident to the machine. These objects are attained by my invention, which is a controller for governing a compound-wound motor, having a resistance in series with its series field-coil and a second resistance arranged to be thrown in a shunt around said series field after the series resistance has been gradually cut out, the shunt resistance being then gradually cut out to cause the motor to run as a simple shunt-motor.

My controller provides for shutting off the power and short-circuiting the armature on itself to cause the motor to operate as a braking-generator in case of an overload or the opening of a hand-switch by an attendant, the result in either case being to open the circuit of an electromagnetic unlocking device and permit a spring to throw the controller-cylinder back to braking position. To shorten the controller as much as possible, the resistance-contacts are placed concentric with the controller-cylinder instead of alongside of it. The contacts which are left on the controller-cylinder operate to make and break the motor-circuit, while the contacts which are placed concentric with the controller-cylinder operate to control or change the character of the motor-circuit without actually opening the circuit at the contacts. In order to extinguish any arc which may be formed when the circuit is opened by the contacts on the controller-cylinder, a magnetic blow-out of the type ordinarily employed in motor-controllers is provided.

Figure 2:
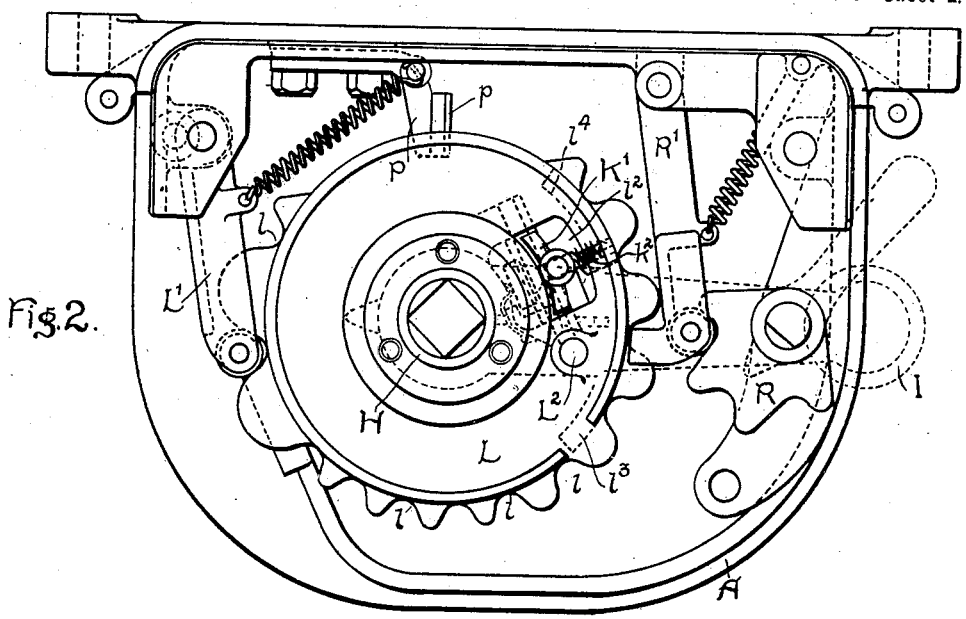
Figure 3:
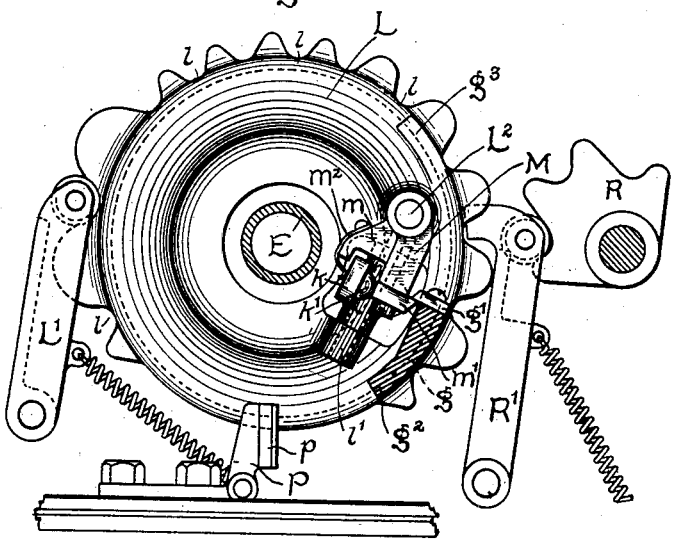
Figure 4:
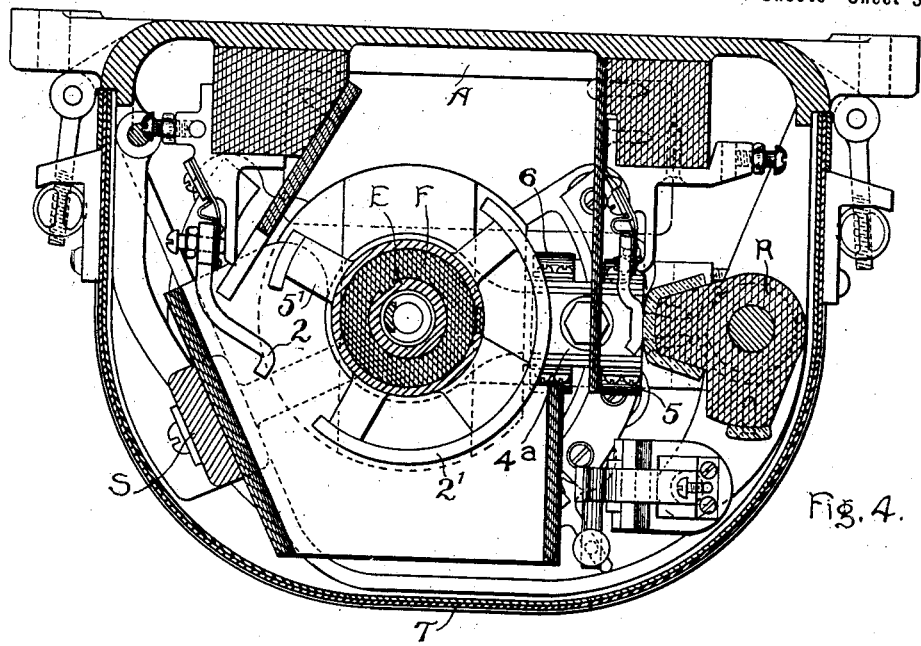
Figure 5:
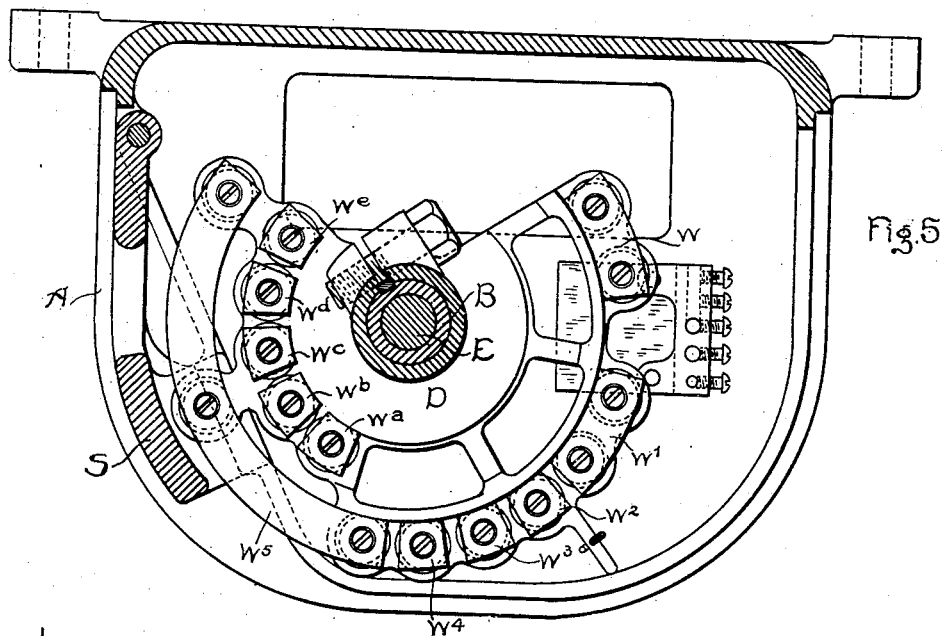
Figure 6:
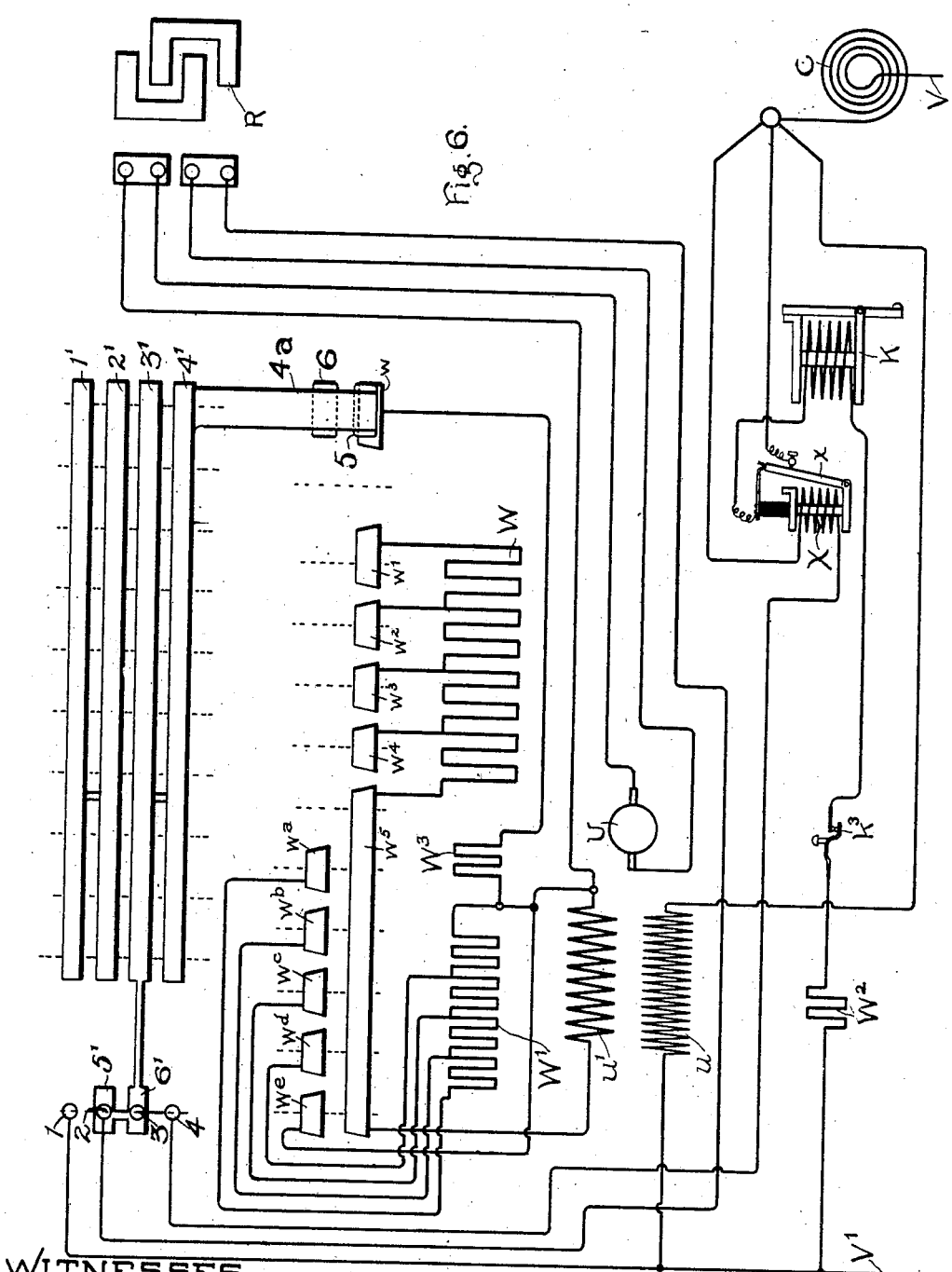

In the accompanying drawings, Figure 1 is a longitudinal section of a controller embodying my invention. Fig. 2 is a top plan view with the cap-plate and handles removed. Fig. 3 is a cross-sectional bottom plan view on the line 3 3, Fig. 1. Fig. 4 is a cross-sectional top plan view on the line 4 4, Fig. 1. Fig. 5 is a cross-sectional top plan view on the line 5 5, Fig. 1. Fig. 6 is a diagram of the circuits. Figs. 7 to 18, inclusive, show the successive changes in the motor connections.

Rising from the bottom of the casing A is an iron post B, which serves as a core for the blow-out coil C and as a support for a frame D, carrying a set of insulated resistance-contacts concentric with the post B. The upper end of the post has a central socket $h$ to form a step-bearing for the foot of a tubular shaft E, which carries the contact-cylinder F, provided at its upper end with an extension G, sleeved on the tubular shaft and having a radially-projecting arm $g$, to which is firmly fastened an upright tooth or catch-plate $g'$. On the upper portion of the tubular shaft is a sleeve H, projecting up through a bearing in the cap-plate A' of the casing, where it is provided with the usual controller-handle I. An electromagnet K is secured outside of the sleeve just under the cap-plate, the coil being preferably concentric with the sleeve, which also carries a star-wheel L, having notches $l$, with which a spring-detent L' engages. The periphery of the core of the electromagnet K is concentric with the controller-shaft, and the armature K' moves around the said periphery as the controller-handle is turned from one position to another. In order to prevent actual contact between the armature and the core of the electromagnet, the armature is preferably provided with a small roller which engages the periphery of the electromagnet whenever the same is energized. Supported on the under side of the star-wheel on an upright pivot $L^2$ is a pawl M, having a tail $m$ and a tooth or catch-plate $m'$, adapted to engage with the tooth or catch-plate $g'$. The armature K' of the electromagnet K is pivotally supported on a lever $k$, fulcrumed in lugs $l'$ on the star-wheel, passing down through an opening $l^2$ therein, and terminating in the space between the pawl M and its tail $m$. The armature preferably has a rounded knob $k'$, pressed against the pawl by a light spring $m^2$, secured to the tail $m$. A spring $k^2$ tends to pull the armature away from the electromagnet when released. Inside the tubular shaft is a helical spring N, connected at its lower end to the tubular shaft E and at its upper end to the sleeve H. On one side of the arm $g$ is a lug $g^2$, and secured to the back of the casing A and in the path of this lug is a stop P, preferably provided on one side with an elastic cushion $p$. The reversing-switch R with its interlock R', the hinged blow-out-magnet pole-pieces S, the fingers 1 2 3 4, the contact-segments 1' 2' 3' 4', and the removable casing-cover T are of the usual construction and need no detailed description.

In Fig. 6 are shown the circuits of the controller and the motor, which is compound wound, having an armature U, a shunt field-coil $u$, and a series field-coil $u'$. The shunt-coil is permanently connected across the mains V V'. The series coil is in series with the resistance-coils W. Another set of resistance-coils W' can be connected in shunt to said series field-coil. The electromagnet K is connected across the mains V V' through a resistance $W^2$. A normally closed push-button $k^3$ controls this circuit; so, also, does the overload-electromagnet X, whose armature $x$ also open-circuits the coil K when attracted by its coil X. The contact-segments on the cylinder F are six in number, 1' 2' being looped together, and also 3' and 4', 5' and 6', and 3' and 6'. An arm $4^a$, extending from the segment 4', carries two yieldably-supported contact-fingers 5 6, arranged to sweep over the concentric contact-plates $w'$ $w^2$, &c., and $w^a$ $w^b$, &c., respectively, connected with the coils of the resistances W W'. The finger 5 is arranged to make contact in the "off" position of the controller with the plate $w$. In this position the fingers 2 and 3 also are in contact with the segments 5' and 6'. The armature-circuit is thus closed on itself through the resistance $W^3$. The finger 1 is connected with the negative main V'. Finger 2 connects with the reversing-switch. Fingers 3 4 are looped together and connected with the positive main V through the overload-coil X.

Figure 7:
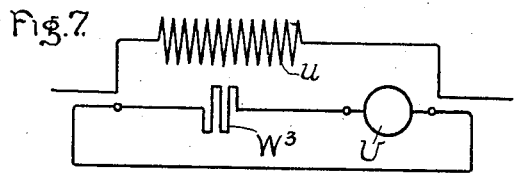
Figure 13:
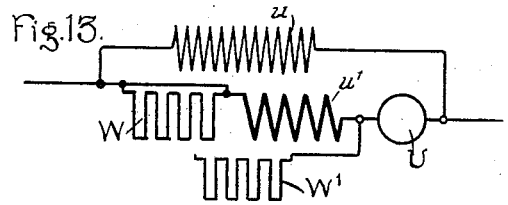
Figure 8:
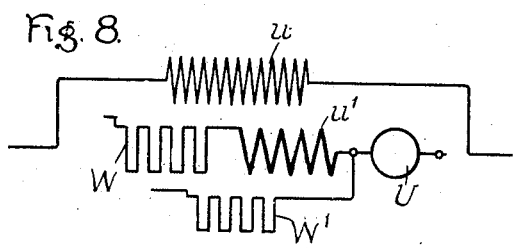
Figure 14:
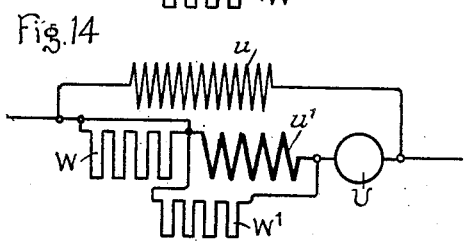
Figure 9:
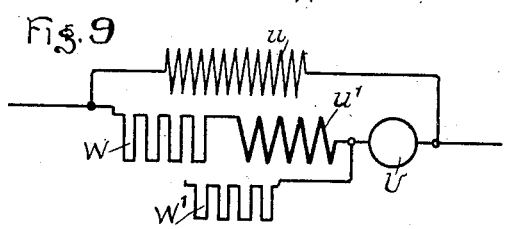
Figure 15:
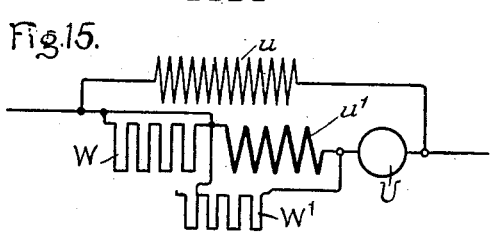
Figure 10:
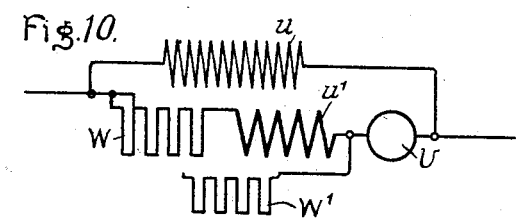
Figure 16:
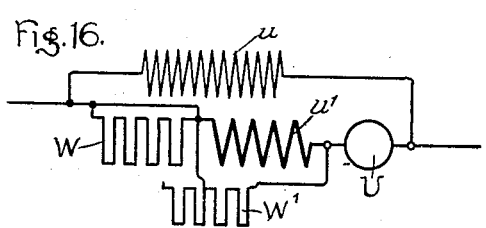
Figure 11:
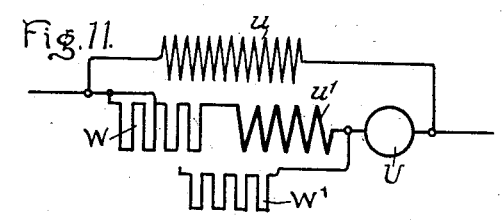
Figure 17:
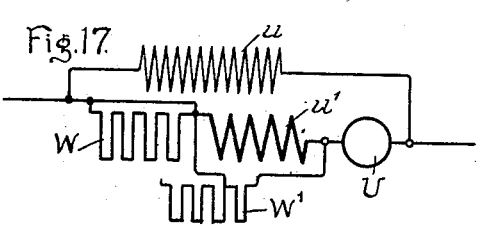
Figure 12:
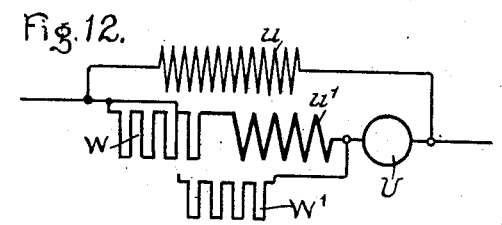
Figure 18:
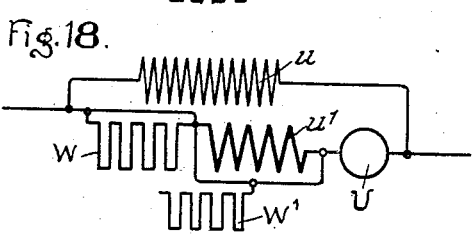

In Fig. 6 the parts are shown in the positions they occupy when the motor is operating as a brake, as indicated in Fig. 7, the armature being short-circuited on itself through the resistance $W^3$ and the series field-coil being open-circuited. The next notch of the star-wheel, as shown in Figs. 2 and 8, is the off position. In the third notch the fingers 1 2 3 4 engage with the segments 1' 2' 3' 4', which are continuous across this and the remaining ten positions. Finger 5 engages plate $w'$. The circuit is then, as shown in Fig. 9, from the positive main V through the coil X to the finger 4, segment 4', arm $4^a$, finger 5, plate $w'$, all the coils of the resistance W, plate $w^5$, series field-coil $u'$, reversing-switch R, armature U, finger 2, segments 2' 1', and finger 1 to the negative main V'. As shown by the successive figures on Sheet 5 of the drawings, the continued movement of the controller gradually cuts out the series resistance W and then closes a shunt around the series coil $u'$ through the resistance W', which it proceeds to cut out until the motor finally runs as a shunt-motor, which is the desirable type of motor for machinery which must run at the same speed irrespective of a varying load.

The spring N is so arranged that when the handle and cylinder are in the position shown in Fig. 2 the spring is under tension, tending to turn the cylinder backward. When the handle is rotated in turning on the power, the catch-plate $m'$, lying behind the catch-plate $g'$, forces the cylinder to move with the handle; but the instant the electromagnet K is deënergized its armature is pulled back and the lever K strikes the tail of the pawl and swings it inwardly, thereby disengaging the two catch-plates and leaving the cylinder free to fly back until the lug $g^2$ strikes the stop P, in which position the motor acts as a brake to quickly stop itself and the machine. This automatic stop-motion takes effect whenever there is an excess of current in the coil X due to an overload or when an attendant presses the button $k^3$. The same action also takes place whenever the line-voltage fails. The return of the handle I to the off position winds up the spring to its normal tension and causes the pawl M to catch in behind the catch-plate $g'$, the edges of the catch-plates being beveled to facilitate this action. When the power is turned full on, the lug $l^3$ strikes the back of the stop P, thus preventing the handle from being carried too far. When the handle is thrown back to the braking position, it is checked by the lug $l^4$ and stop P.

The arrangement of the resistance-contacts concentric with the contact-cylinder permits the use of a very short cylinder, since it has to accommodate, in different planes, only the few contact-segments necessary to control the power-circuit. This enables me to retain all the advantages of the usual magnetic blow-out for the power-contacts, while with respect to the resistance-contacts it will be noted that the fingers or brushes 5 and 6 are long enough to span the breaks between them, so that the circuit is not broken as they pass from one position to another.

While I have illustrated my invention as applied to a controller for governing a compound-wound motor having a resistance in series with its series field-winding and another resistance arranged to be thrown in a shunt around the series winding, it is to be understood that my invention is of general application in controllers and is not limited to any particular system of control or to any particular arrangement of resistances in the motor-circuit, and in the appended claims I aim to cover my invention in any of the uses for which it may be applicable.

What I claim as new, and desire to secure by Letters Patent of the United States, is—

1. In a controller, a rotatable contact-carrying member, a handle for operating said member, an electromagnet concentric with the shaft on which said handle is mounted, an armature for said electromagnet operatively connected to the controller-handle so as to be rotated therewith in a path concentric with the periphery of the electromagnet, and means controlled by said armature for locking the handle to the contact-carrying member.

2. In a controller, a rotatable contact-carrying member, a handle for operating said member, an electromagnet concentric with the shaft on which said handle is mounted, an armature for said electromagnet operatively connected to the controller-handle so as to be rotated therewith in a path concentric with the periphery of the electromagnet, means controlled by said armature for locking the handle to the contact-carrying member, and means for returning the said member to its initial position whenever it is unlocked from the handle.

3. In a controller, a rotatable contact-carrying member, a handle for operating said member, an electromagnet concentric with the shaft on which said handle is mounted, and an armature for said magnet operatively connected with the controller-handle so as to be rotated therewith in a path concentric with the periphery of the electromagnet, the said armature operating in one position to lock the rotatable member to the controller-handle and in another position to unlock the said member from the handle.

4. In a controller, a rotatable contact-carrying member, a handle for operating said member, an electromagnet concentric with the shaft on which said handle is mounted, an armature for said magnet operatively connected with the controller-handle so as to be rotated therewith in a path concentric with the periphery of the electromagnet, the said armature operating when the magnet is energized to lock the rotatable member to the controller-handle, and a spring for moving the armature to unlock the member from the handle when the magnet is deënergized.

5. A controller for an electric motor, comprising a rotary tubular shaft, a contact-cylinder secured thereto, a handle sleeved on the shaft, means for locking the handle to the shaft, an electromagnetic device for unlocking them, and a coiled spring in said tubular shaft attached to the shaft and the handle.

6. A controller for an electric motor, comprising a rotary shaft, a contact-cylinder secured thereto, an arm moving with said cylinder, a catch-plate on the arm, a handle sleeved on the shaft and carrying a pawl adapted to engage with the catch-plate, and an electromagnetic device for actuating the pawl.

7. A controller for an electric motor, comprising a contact-cylinder and shaft, an arm moving with the cylinder and carrying a catch-plate, a handle sleeved on the shaft and carrying a star-wheel and an electromagnet, a pawl pivoted on the star-wheel and adapted to engage with the catch-plate, and an armature for the electromagnet arranged to disengage said pawl.

8. In a controller, the combination with a rotatable member, of a plurality of circuit-controlling contacts arranged alongside of said member, a plurality of resistance-controlling contacts arranged concentric with said member, cylindrical contacts carried by said rotatable member and adapted to remain in engagement with the circuit-controlling contacts in all the power positions of the controller, and a brush contact or contacts electrically connected to one of the contacts on said rotatable member and adapted to successively engage the concentrically-arranged contacts.

9. In a controller, a rotatable member provided with cylindrical contacts, fixed contacts arranged to be engaged thereby, a supporting-frame located beneath the said rotatable member, a series of contacts mounted thereon in a circle concentric with the axis of rotation of said rotatable member, and a contact on the rotatable member arranged to successively engage the contacts of the said series as the said member is rotated.

10. In a controller, a set of fixed contacts arranged one above another, a rotatable member provided with cylindrical circuit making and breaking contacts adapted to engage said fixed contacts, one or more series of circuit-controlling contacts mounted in a circle concentric with the axis of rotation of said rotatable member, and one or more contact-fingers mounted on said rotatable member and arranged to successively engage the contacts of the said series, as the said member is rotated, without opening the circuit at said contacts.

11. In a controller, a set of fixed contacts arranged one above another, a rotatable member provided with cylindrical circuit making and breaking contacts adapted to engage said fixed contacts, a series of circuit-controlling contacts mounted in a circle concentric with the axis of rotation of the said rotatable member, a coöperating contact-finger mounted on said rotatable member and electrically connected to the circuit making and breaking contacts, and means for extinguishing any arc which may be formed on the opening of the circuit at the circuit making and breaking contacts.

12. In a controller, a set of fixed contacts arranged one above another, a rotatable member provided with cylindrical circuit making and breaking contacts adapted to engage said fixed contacts, a series of circuit-controlling contacts mounted in a circle concentric with the axis of rotation of the said rotatable member, a coöperating contact-finger mounted on said rotatable member and electrically connected to the circuit making and breaking contacts, and a blow-out magnet for the circuit making and breaking contacts.

13. In a controller, a set of fixed contacts arranged one above another, a rotatable member provided with cylindrical circuit making and breaking contacts adapted to engage said fixed contacts, a second set of fixed contacts rigidly mounted in a circle concentric with the axis of rotation of the said rotatable member, and a yieldably-supported brush or contact-finger adapted to successively engage the contacts of the said second set, the said brush or contact being mounted on said rotatable member and electrically connected to the circuit making and breaking contacts thereon.

14. In a controller for an electric motor, the combination with a stationary post, of a frame supported thereon carrying one or more series of contact-plates concentric with said post, a contact-cylinder having its shaft journaled on the upper end of said post, and an arm on said cylinder carrying one or more contact-fingers to engage with said plates.

15. In a controller for an electric motor, the combination with a stationary post, of a blow-out coil concentric therewith, and a contact-cylinder having its shaft stepped in the upper end of said post.

16. The combination with a compound-wound electric motor, of a resistance in series with the series field-coil, a second resistance, and a single switch mechanism for successively cutting out the series resistance and throwing the second resistance in shunt around the series field-coil.

17. The combination with a compound-wound electric motor, of two resistances, and a single switch mechanism for successively connecting one of said resistances in series with the series field-coil, gradually cutting out said resistance, throwing the second resistance in shunt around said series field-coil, and finally gradually cutting out said second resistance.

In witness whereof I have hereunto set my hand this 9th day of February, 1901.

LEONARD A. TIRRILL.

Witnesses:
 DUGALD McK. McKILLOP,
 JOHN J. WALKER.